United States Patent [19]

Dancsik

[11] Patent Number: 4,511,128
[45] Date of Patent: Apr. 16, 1985

[54] ROTARY TABLE

[76] Inventor: Joseph J. Dancsik, 37970 Pointe Rosa, Mt. Clemens, Mich. 48045

[21] Appl. No.: 517,073

[22] Filed: Jul. 25, 1983

[51] Int. Cl.³ ............................................. F16C 29/00
[52] U.S. Cl. ..................................... 269/61; 269/285
[58] Field of Search .............. 409/141, 221, 168, 165; 308/3 R, 3 A; 269/60, 61, 63, 285, 71, 73, 74, 82; 74/813 L, 825

[56] References Cited

U.S. PATENT DOCUMENTS

| | | | |
|---|---|---|---|
| 2,353,891 | 7/1944 | Gruntorad | 269/71 |
| 3,083,594 | 4/1963 | Budney et al. | 269/61 |
| 3,563,186 | 2/1971 | Piper et al. | 269/71 |
| 3,813,132 | 5/1974 | Sahm | 308/3 A |
| 3,890,017 | 6/1975 | Blue | 308/3 A |
| 3,990,689 | 11/1976 | Eklund | 269/71 |
| 4,222,692 | 9/1980 | Pavlovsky | 409/144 |

*Primary Examiner*—Robert C. Watson
*Attorney, Agent, or Firm*—Basile, Weintraub & Hanlon

[57] ABSTRACT

A rotary table for holding a workpiece for machining. The rotary table comprises a base, a rotary member supported by the base, a transversely movable member carried by the rotary member, a laterally movable member carried by the transversely movable member, a lead screw device for displacing the laterally movable and transversely movable members, and a worm and worm gear for selectively rotating the rotary member relative to the base. The rotary table includes a thrust bearing for supporting the rotary member against the base, and a biasing means abutting the thrust bearing at one end and abutting the rotary member at another end to allow a slight contact between the rotary member and the base to exclude dirt and allow rotation of the rotary member relative to the base with a minimum amount of friction.

5 Claims, 3 Drawing Figures

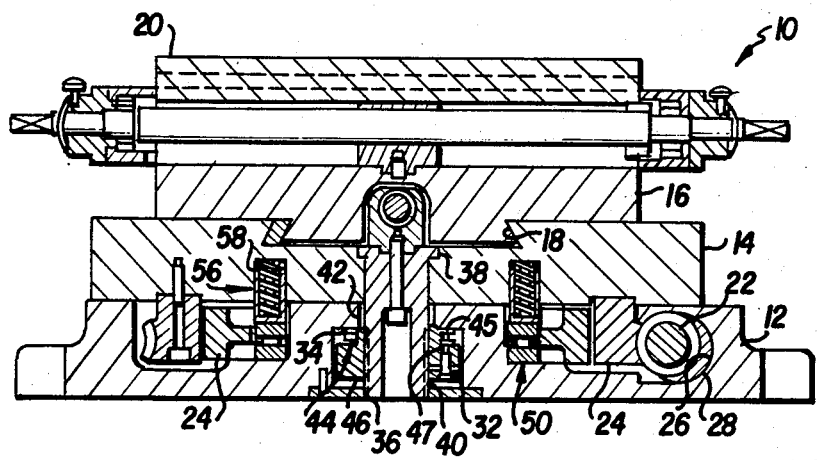

ROTARY TABLE

BACKGROUND OF THE INVENTION

I. Field of the Invention

The present invention generally relates to the field of devices for holding a workpiece while it is machined. In particular, the present invention is concerned with a rotary table for holding a workpiece which allows the workpiece to be rotated relative to the base of the machine with a minimum amount of friction.

II. Description of the Prior Art

Rotary tables for holding a workpiece while it is being machined are known in the prior art. The prior art devices consist generally of a base mounted to the machine and a rotary member supported by the base. A worm and worm gear device is usually provided which allows the machine operator to rotate a handle attached to the worm which results in a rotation of the rotary member relative to the base. Vertical support of the rotary member is provided by a lubricated flat surface formed on the base which abuts a complementary flat surface on the rotary member. The amount of friction between the base and the rotary member is proportional to the weight supported by the flat surfaces. Heavy workpieces require a substantial amount of torque to rotate the rotary member relative to the base, and considerable effort is required to rotate the worm to achieve rotation of the rotary member relative to the base. This results in wear of the worm and worm gear which results in a considerable amount of backlash and the need for frequent repairs. Chips and debris from the machining operations also tend to migrate and lodge themselves between the flat surfaces further increasing the friction and wear.

III. Information Disclosure Statement

The aforementioned description of the prior art, in the opinion of the applicant and the applicant's attorney, represents the closest prior art and/or information of which the applicant and his attorney are aware.

SUMMARY OF THE INVENTION

The present invention, which will be described in greater detail hereinafter, comprises a rotary table for holding a workpiece for machining which includes a base, a rotary member carried by the base, a transversely movable member carried by a dovetail formed in the rotary member for transversely displacing the workpiece relative to the base, a laterally movable member carried by a dovetail formed in the transversely movable member for laterally displacing the workpiece relative to the base, and a worm carried by the base with a worm gear carried by the rotary member engaging the worm wherein rotation of the worm causes rotation of the rotary member.

The rotary table of the present invention includes a low-friction, rotational support for the rotary member which comprises a step bore having a shoulder formed in the base with a central post having a threaded end affixed to the rotary member which is rotatingly carried within the step bore. An adjustable thrust bearing is carried within the step bore and includes a first end abutting the shoulder and a second end abutting a collar which threadingly engages the threaded end. An outer thrust bearing is provided having a lower end abutting the base and an upper end abutting a biasing means. The biasing means comprises a plurality of springs carried in a plurality of bores formed in the rotary member. The springs abut the outer bearing upper end at one end and a bottom of the plurality of bores at another end to bias the rotary member upward and overcome the weight of the rotary member and the workpiece. Rotation of the threaded collar in a first direction moves the rotary member against the biasing means to draw the rotary member toward the base so that the position of the rotary member is adjustable with respect to the base and a close relationship between the base and the rotary member can be established without the rotary member bearing heavily against the base and inducing high friction between the base and the rotary member.

It is therefore a primary object of the present invention to provide a new and improved rotary table for holding a workpiece during machining.

It is a further object of the present invention to provide such a rotary table having an outer thrust bearing for carrying the weight of the workpiece with a minimum of friction.

It is yet another object of the present invention to provide a rotary table having a thrust bearing to support the weight of the workpiece and a biasing means to exert a force between the rotary member and thrust bearing to prevent heavy contact between the rotary member and the base.

It is a further object of the present invention to provide an adjustment device to draw the rotary member toward the base and establish the rotary member in contact with the base without friction inducing heavy contact between the rotary member and the base.

It is a further object of the present invention to provide a releasable worm and worm gear device for rotating the rotary member in an engaged position and freeing the rotary member for rotation independent of the worm in a released position.

Further objects, advantages and applications of the present invention will become apparent to those skilled in the art of rotary tables when the accompanying description of one example of the best mode contemplated for practicing the invention is read in conjunction with the accompanying drawing.

BRIEF DESCRIPTION OF THE DRAWING

The description herein mades reference to the accompanying drawing wherein like reference numbers refer to like parts throughout the various views, and wherein:

FIG. 1 illustrates a partially sectioned plan view of the rotary table of the present invention;

FIG. 2 represents a cross-sectional view taken along the line 2—2 of FIG. 1; and FIG. 3 illustrates an enlarged cross-sectional view of the biasing means and thrust bearing shown in FIG. 2.

DESCRIPTION OF THE PREFERRED EMBODIMENT

Referring now to the drawing, there is illustrated in FIG. 1 one example of the present invention in the form of a rotary table 10 comprising a base 12 and a rotary member 14 carried by the base. A transversely movable member 16 is carried by a dovetail 18 formed in the rotary member 14 for transversely displacing the workpiece relative to the base. A laterally movable member 20 is carried by a dovetail (not shown) formed in the transversely movable member for laterally displacing the workpiece relative to the base. The transversely movable member 16 and the laterally movable member 20 allow linear displacement of the workpiece relative to the base. A worm 22 is carried by a base 12 and engages a worm gear 24 carried by the rotary member 14. Rotation of the worm 22 causes rotation of a rotary member 14.

A means is provided for selectively disengaging the worm from the worm gear to allow independent rotation of a rotary member 14 relative to the base 12 without rotation of the worm 22. This means comprises a radially displaced transverse bore 26 formed in the base 12 and a bushing 28 having an eccentric bore 30 carried in the radially displaced bore 26. Rotation of the bushing 28 in a first direction meshes the worm 22 with the worm gear 24 so that rotation of the worm causes rotation of the rotary member 14. Rotation of the bushing 28 in a counter direction unmeshes the worm 22 from the worm gear 24 and allows the rotary member 14 to freely rotate independent of the worm 22. This allows the operator of the machine to rapidly rotate the rotary member 14 from one angular position to another and then mesh the worm 22 with the worm gear 24 and make a fine adjustment of the angular position of the rotary member 14 utilizing the worm and the worm gear.

A low-friction rotational support is provided for the rotary member 14, as illustrated in FIGS. 2 and 3 of the drawing, and comprises a step bore 32 formed in the base 12 having a shoulder 34. A central post 36 extending from the rotary member 14 includes a flanged end 38 and a threaded end 40. The central post 36 is slidingly carried in the step bore 32 and is radially supported by a bearing 42. An adjustable thrust bearing 44 is carried in the step bore and includes a first end 45 abutting the shoulder and a second end 47 opposed to the first end. A threaded collar 46 threadingly engages the threaded end 40 and abuts the second end of the thrust bearing 44.

An outer thrust bearing 50 is carried by the base 12 and includes a lower end 52 abutting the base and an upper end 54 abutting a biasing means 56. The biasing means 56 comprises a plurality of springs 58 carried in a plurality of bores 60 formed in the rotary member 14. The springs 58 abut the upper end 54 at one end and abut a bottom of the bore 60 at another end to bias the rotary member 14 upward and overcome the weight of the rotary member and the workpiece. Rotation of the threaded collar 46 in a first direction moves the rotary member against the biasing means 56 and draws the rotary member toward the base so that the vertical position of the rotary member is adjustable with respect to the base. Rotation of the threaded collar 46 in an opposite direction allows the biasing means 56 to move the rotary member 14 away from the base 12.

In a preferred embodiment the bearing 42 is larger in diameter than the adjustable thrust bearing 44 and stabilizes the rotary member 14, preventing tipping when an off-center load is applied to the rotary member.

The rotary member 14 overlays the base 12 and is adjusted against the biasing means 56 using the threaded collar 46 so that the rotary member lightly touches the base with most of the weight of the workpiece carried by the biasing means. This allows the rotary member to rotate relative to the base with a minimum of friction. The light touching between the rotary member and the base along with the overlaying of the two parts prevents the intrusion of machining chips into the interior of the device and the resulting wear and friction that would occur.

The rotary table of the present invention further includes a brake means 60 for releasably locking the rotary member 14 to the base 12. The brake means 60 comprises a center bore 62 formed in the worm gear 24 which is configured to mate with the braking surface of a pair of opposed brake shoes 64. The opposed brake shoes 64 are pivotally supported at one end 66 and are radially movable at another end 68. An hydraulic cylinder 70 is positioned between another ends of the brake shoes, and a biasing means 72 comprising an extension spring attached to the another ends urges the another ends toward the hydraulic cylinder. When hydraulic pressure is applied to the hydraulic cylinder 70 by means of a tube 74, the brake shoes 64 are urged against the center bore 62 to lock the rotary member to the base. When hydraulic pressure is released, the biasing means 72 displaces the opposed brake shoes from contact with the center bore and allows the rotary member 14 to freely rotate relative to the base 12.

In a preferred embodiment the contacting surfaces between the base 12 and the rotary member 14 are scraped or lapped to a high degree of flatness allowing a light touching between parts with a minimum of friction. The high degree of flatness between surfaces also prevents the invasion of dirt between surfaces which would cause wear and friction.

It can thus be seen that the present invention has provided a new and improved rotary table for machining a workpiece. The device of the present invention provides a precision rotary table with a minimum of friction that holds the workpiece in a sturdy manner and allows rapid and accurate angular displacement of the workpiece.

It should be understood by those skilled in the art of rotary tables that other forms of the applicant's invention may be had, all coming within the spirit of the invention and the scope of the appended claims.

Having thus described my invention, what I claim is:

1. A rotary table for holding a workpiece for machining comprising: a base, a rotary member supported by the base, a transversely movable member carried by the rotary member, a laterally movable member carried by the transversely movable member, means for displacing the transversely movable member linearly relative to the rotary member, means for displacing the laterally movable member linearly relative to the transversely movable member, and a worm and worm gear means for selectively rotating the rotary member relative to the base, the invention comprising:

a thrust bearing for supporting the rotary member against the base, a biasing means abutting said thrust bearing at one end and abutting the rotary member at another end, whereby the rotary member lightly abuts the base and is supported by said thrust bearing with a minimum of friction;

an adjustable thrust bearing for selectively adjusting said biasing means to bring the rotary member into light contact with the base and allow the rotary member to rotate relative to the base with a minimum of friction;

said adjustable thrust bearing comprising:

a central post projecting axially from the rotary member, having a threaded end;

a central step bore having a shoulder formed in the base;

one end of said adjustable thrust bearing abutting said shoulder;

a threaded collar engaging said threaded end and abutting another end of said adjustable thrust bearing; and whereby rotation of said threaded collar in one direction moves the rotary member against said biasing means and toward the base, and rotation of said threaded collar in a counter direction allows said biasing means to displace the rotary member away from the base.

2. The invention of claim 1 further comprising a releasable brake means for releasably locking the rotary member to the base.

3. A rotary table for holding a workpiece for machining comprising: a base, a rotary member supported by the base, a transversely movable member carried by the rotary member, a laterally movable member carried by the transversely movable member, means for displacing the transversely movable member linearly relative to the rotary member, means for displacing the laterally movable member linearly relative to the transversely movable member, and a worm and worm gear means for selectively rotating the rotary member relative to the base, the invention comprising:

a thrust bearing for supporting the rotary member against the base, a biasing means abutting said thrust bearing at one end and abutting the rotary member at another end, whereby the rotary member lightly abuts the base and is supported by said thrust bearing with a minimum of friction;

an adjustable thrust bearing for selectively adjusting said biasing means to bring the rotary member into light contact with the base and allow the rotary member to rotate relative to the base with a minimum of friction;

a releasable brake means for releasably locking the rotary member to the base;

said releasable brake means comprising:

a worm gear with a center bore carried by the rotary member;

a pair of opposed brake shoes pivotally supported at one end by the base and radially movable at another end;

an hydraulic cylinder positioned beween said another ends;

biasing means urging said another ends toward said hydraulic cylinder; and whereby applying hydraulic pressure to said hydraulic cylinder urges said opposed brake shoes against said center bore locking the rotary member to the base, and releasing the hydraulic pressure from said hydraulic cylinder allows said biasing means to displace said opposed brake shoes from said center bore allowing the rotary member to freely rotate relative to the base.

4. The invention of claim 1 further comprising means for releasably disengaging said worm from said worm gear allowing rapid rotation of said rotary member without rotation of said worm.

5. A rotary table for holding a workpiece for machining comprising: a base, a rotary member carried by the base, a transversely movable member carried by a dovetail formed in the rotary member for transversely displacing the workpiece relative to the base, a laterally movable member carried by a dovetail formed in the transversely movable member for laterally displacing the workpiece relative to the base, a worm carried by the base and a worm gear engaging the worm and carried by the rotary member wherein rotation of the worm causes rotation of the rotary member;

the invention comprising:

a low-frictional rotational support for the rotary member comprising: a step bore having a shoulder formed in the base, a central post having a threaded end and a flanged end supported within said step bore, said flanged end carried by the rotary member, an adjustable thrust bearing carried in said step bore having a first end abutting said shoulder and a second end, a threaded collar threadingly engaging said threaded end and abutting said second end, an outer thrust bearing with a lower end abutting the base and an upper end abutting a biasing means, said biasing means comprising a plurality of springs carried in a plurality of bores formed in the rotary member, said springs abutting said upper end at one end and a bottom of said plurality of bores at another end to bias the rotary member upward to overcome the weight of the rotary member and the workpiece, said flanged end abutting the rotary member so that rotation of said threaded collar in a first direction moves the rotary member against said biasing means drawing the rotary member toward the base so that the position of the rotary member is adjustable with respect to the base;

a radially displaced transverse bore formed in the base, a bushing having an eccentric bore rotatingly carried in said eccentric bore; and wherein rotation of said bushing in a first direction meshes the worm with the worm gear so that rotation of the worm causes rotation of the rotary member, and rotation of said bushing in a counter direction unmeshes the worm from the worm gear so that the rotary member can freely rotate independent of the worm.

* * * * *